United States Patent
McGovern et al.

(10) Patent No.: US 7,774,610 B2
(45) Date of Patent: Aug. 10, 2010

(54) METHOD AND APPARATUS FOR VERIFIABLY MIGRATING WORM DATA

(75) Inventors: William P. McGovern, San Jose, CA (US); Jeffrey D. Merrick, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 1155 days.

(21) Appl. No.: 11/227,329

(22) Filed: Sep. 14, 2005

(65) Prior Publication Data

US 2006/0126468 A1    Jun. 15, 2006

Related U.S. Application Data

(60) Provisional application No. 60/636,424, filed on Dec. 14, 2004.

(51) Int. Cl.
*H04L 9/32* (2006.01)
(52) U.S. Cl. ..................................... 713/180
(58) Field of Classification Search ................. 713/180; 714/6; 707/204; 711/161
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,163,148 A | 11/1992 | Walls | |
| 5,235,695 A | 8/1993 | Pence | |
| 5,269,022 A | 12/1993 | Shinjo et al. | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,555,371 A | 9/1996 | Duyanovich et al. | |
| 5,638,509 A | 6/1997 | Dunphy et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,715 A | 6/1998 | Madany et al. | |
| 5,805,864 A | 9/1998 | Carlson et al. | |
| 5,809,511 A | 9/1998 | Peake | |
| 5,809,543 A | 9/1998 | Byers et al. | |
| 5,835,953 A | 11/1998 | Ohran | |

(Continued)

FOREIGN PATENT DOCUMENTS

CA     2 256 934 A1     6/2000

(Continued)

OTHER PUBLICATIONS

Simon L. Garfinkel et al., "Remembrance of Data Passed: A Study of Disk Sanitization Practices", IEEE Security and Privacy, vol. 1, No. 1, 2003, 19 pages.

(Continued)

*Primary Examiner*—Emmanuel L Moise
*Assistant Examiner*—Ali S Abyaneh
(74) *Attorney, Agent, or Firm*—Perkins Coie, LLP

(57) ABSTRACT

A file system in a storage system allows a user to designate data as write-once read-many (WORM) data. The WORM data are stored in a first set of storage media of the storage system. Signature data are generated from the WORM data. Using the signature data, the integrity of the WORM data can be verified.

18 Claims, 9 Drawing Sheets

U.S. PATENT DOCUMENTS

| | | | |
|---|---|---|---|
| 5,854,720 A | 12/1998 | Shrinkle et al. | |
| 5,857,208 A | 1/1999 | Ofek | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 6,021,408 A | 2/2000 | Ledain et al. | |
| 6,021,491 A * | 2/2000 | Renaud | 713/179 |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,134,660 A | 10/2000 | Boneh et al. | |
| 6,163,856 A | 12/2000 | Dion et al. | |
| 6,173,293 B1 | 1/2001 | Thekkath et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day, III et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,397,307 B2 | 5/2002 | Ohran | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara et al. | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,796,489 B2 * | 9/2004 | Slater et al. | 235/379 |
| 6,816,941 B1 | 11/2004 | Carlson et al. | |
| 6,816,942 B2 | 11/2004 | Okada et al. | |
| 6,834,324 B1 | 12/2004 | Wood | |
| 6,839,843 B1 * | 1/2005 | Bacha et al. | 713/176 |
| 6,850,964 B1 | 2/2005 | Brough et al. | |
| 6,877,016 B1 | 4/2005 | Hart et al. | |
| 6,898,600 B2 | 5/2005 | Fruchtman et al. | |
| 6,915,397 B2 | 7/2005 | Lubbers et al. | |
| 6,931,557 B2 | 8/2005 | Togawa et al. | |
| 6,950,263 B2 | 9/2005 | Suzuki et al. | |
| 6,973,534 B2 | 12/2005 | Dawson et al. | |
| 6,978,283 B1 | 12/2005 | Edwards et al. | |
| 6,978,325 B2 | 12/2005 | Gibble et al. | |
| 7,007,043 B2 | 2/2006 | Farmer et al. | |
| 7,020,779 B1 | 3/2006 | Sutherland | |
| 7,032,126 B2 | 4/2006 | Zalewski et al. | |
| 7,055,009 B2 | 5/2006 | Factor et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,111,194 B1 | 9/2006 | Schoenthal et al. | |
| 7,127,388 B2 | 10/2006 | Yates et al. | |
| 7,139,891 B1 * | 11/2006 | Apvrille et al. | 711/163 |
| 7,152,078 B2 | 12/2006 | Yamagami | |
| 7,155,465 B2 | 12/2006 | Lee et al. | |
| 7,155,586 B1 | 12/2006 | Wagner et al. | |
| 7,200,726 B1 | 4/2007 | Gole et al. | |
| 7,203,726 B2 | 4/2007 | Hasegawa | |
| 7,302,057 B2 * | 11/2007 | Rotholtz et al. | 380/200 |
| 7,346,623 B2 | 3/2008 | Prahlad et al. | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0091670 A1 | 7/2002 | Hitz et al. | |
| 2002/0095557 A1 | 7/2002 | Constable et al. | |
| 2002/0144057 A1 | 10/2002 | Li et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0005313 A1 | 1/2003 | Gammel et al. | |
| 2003/0025800 A1 | 2/2003 | Hunter et al. | |
| 2003/0037211 A1 | 2/2003 | Winokur | |
| 2003/0046260 A1 | 3/2003 | Satyanarayanan et al. | |
| 2003/0120676 A1 | 6/2003 | Holavanahalli et al. | |
| 2003/0126136 A1 | 7/2003 | Omoigui | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0158766 A1 | 8/2003 | Mital et al. | |
| 2003/0182350 A1 | 9/2003 | Dewey | |
| 2003/0188208 A1 | 10/2003 | Fung | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0103147 A1 | 5/2004 | Flesher et al. | |
| 2004/0167903 A1 | 8/2004 | Margolus et al. | |
| 2004/0168034 A1 | 8/2004 | Homma et al. | |
| 2004/0168057 A1 | 8/2004 | Margolus et al. | |
| 2004/0181388 A1 | 9/2004 | Yip et al. | |
| 2004/0181707 A1 | 9/2004 | Fujibayashi | |
| 2004/0186858 A1 | 9/2004 | McGovern et al. | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0097260 A1 | 5/2005 | McGovern et al. | |
| 2005/0108302 A1 | 5/2005 | Rand et al. | |
| 2005/0144407 A1 | 6/2005 | Colgrove et al. | |
| 2005/0182910 A1 | 8/2005 | Stager et al. | |

| | | | |
|---|---|---|---|
| 2005/0240813 | A1 | 10/2005 | Okada et al. |
| 2006/0010177 | A1 | 1/2006 | Kodama |
| 2006/0047895 | A1 | 3/2006 | Rowan et al. |
| 2006/0047902 | A1 | 3/2006 | Passerini |
| 2006/0047903 | A1 | 3/2006 | Passerini |
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0259160 | A1 | 11/2006 | Hood et al. |

FOREIGN PATENT DOCUMENTS

| | | | |
|---|---|---|---|
| EP | 0 845 733 | A2 | 6/1998 |
| EP | 0 869 460 | A2 | 10/1998 |
| EP | 1 058 254 | A2 | 12/2000 |
| EP | 1 122 910 | A1 | 8/2001 |
| EP | 1 233 414 | A2 | 8/2002 |
| EP | 1333379 | A2 | 8/2003 |
| EP | 1671231 | | 6/2006 |
| WO | WO-9906912 | | 2/1999 |
| WO | WO-9903098 | | 11/1999 |
| WO | WO 01/18633 | A1 | 3/2001 |
| WO | WO-0118633 | A1 | 3/2001 |
| WO | WO 03/067438 | A2 | 8/2003 |
| WO | WO-03067438 | A2 | 8/2003 |
| WO | WO 2004/084010 | A2 | 9/2004 |
| WO | WO-2004084010 | A2 | 9/2004 |
| WO | WO-2005031576 | A2 | 4/2005 |
| WO | WO-2006023990 | A2 | 3/2006 |
| WO | WO-2006023991 | A2 | 3/2006 |
| WO | WO-2006023992 | A2 | 3/2006 |
| WO | WO-2006023993 | A2 | 3/2006 |
| WO | WO-2006023994 | A1 | 3/2006 |
| WO | WO-2006023995 | A2 | 3/2006 |

OTHER PUBLICATIONS

Decru, "Decru Datafort E-Series Storage Security Appliances, Transparent Data Security for Network Attached Storage (NAS)", 2004. 2 pages.
Joan Daemen et al., "Note on Naming", Rijndael, Sep. 4, 2003 , 2 pages.
Joan Daemen et al., "AES Proposal: Rijndael", The Rijndael Block Cipher, Document Version 2, Mar. 9, 1999, 45 pages.
Chris Lueth, "WORM Storage on Magnetic Disks Using SnapLock Compliance™ and SnapLock Enterprise™", Network Appliance, Inc., Sep. 2003, sections 1-5, 13 pages.
"Network Appliance WORM Storage Solution: SEC 17 a-4(f) Compliance Assessment", Network Appliance, Inc., Jul. 10, 2003, pp. i-20.
"Alacritus Anhounces Disk-Based Successor to Tape", Knapp Comm., Aug. 21, 2002.
"Alacritus Creates 'Next Critical Step' in Disaster Recovery for Patrick Air Force Base, Securitus VTL Sets the Pace", Apr. 20, 2004.
"Alacritus to Demo Chronospan Continuous Data Protection with the Cisco MDS 9000", Apr. 1, 2004.
"Alacritus, Hitachi CP and Nissho Team to Create Virtual Tape Library Appliance: Industry's First Virtual Tape Library Appliance to Replace Storage Tape Libraries", Alacritus Software, Inc., Jun. 25, 2001.
"Alacritus, Hitachi CP and Nissho Team to Create Virtual Tape Library" internetnews.com, Jun. 25, 2001.
"Alacritus and Network Appliance Deliver Advanced Virtual Tape Library, Solution Shortens Backup Windows, Accelerates Data Recovery, and Simplifies Backup Management", Dec. 7, 2004.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability", Alacritus Software, Jul. 8, 2002.

"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Jun. 25, 2001.
"Alacritus Software Announces Securitus I, The Industry's First Virtual Tape Library Solution: Securitus I Hearlds Advent of 'Disruptive Technology' that Serves as Replacement to Tape Libraries", Alacritus Software, Inc. Apr. 9, 2002.
"Alacritus Software Announces Virtual Tape Library Support for Legato Networker Data Protection Solution", Alacritus Software, Inc., Jan. 8, 2002.
"Alacritus Software's Chronospan: Make Time for Continuous Data Protection", Aberdeen Group, Inc., Oct. 2003.
"Alacritus Software FAQs," Alacritus Software, Inc. Jul. 2001.
"Alacritus Software's Securitus: Defining the Way to Virtual Tape Libraries", Aberdeen Group, Inc. Jul. 2003.
"Alacritus Software's Securitus I: Pointing the Way to Virtual Tape Libraries" Aberdeen Group, Inc. Mar. 2002.
Baltazar, Henry "More Intelligence is on the Way" eWEEK, Sep. 15, 2003.
Baltazar, Henry "Weaving Apps into SAN Fabric" eWEEK, Mar. 24, 2003.
Barrett, Alex, "The Case for Network Smart", Storage Magazine, Jun. 2003.
Biggar, Heidi, "Alacritus Enables Disk-Based Backup", InfoStor, Sep. 2001.
Biggar, Heidi, "Disk and Tape Forge New Partnerships in backup Arena" InfoStor, Nov. 2001.
Camphusein, Alicia, "Hitachi Inks OEM Deal with Legato", Knapp Comm., Jul. 2002.
"Case Study Shizuoka-ken Noukyou Densan Center K.K., Reducing Management Costs Through Tapeless Backup At An iDC", Apr. 7, 2004.
"Chronospan" Alacritus Website, Oct. 2003.
"Cisco and Storage ISVs to Demo Protocol-Based Interface between Storage Appliances and the Cisco MDS 9000", Mar. 30, 2004.
"Continuous Data Protection: Business Continuity for the Era of Networked Storage: An Executive White Paper", Aberdeen Group, Inc., Jul. 2003.
"Customer Success" Alacritus Website, Oct. 2003.
Joan Daemen et al., "AES Proposal: Rijndael", The Rijndael Block Cipher, Document Version 2, Mar. 9, 1999, 45 pages.
Joan Daemen et al., "Note on Naming", Rijndael, Sep. 4, 2003, 2 pages.
Decru, "Decru Datafort E-Series Storage Security Appliances, Transparent Data Security for Network Attached Storage (NAS)", 2004. 2 pages.
"Disk-Based Data Protection" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Simon L. Garfinkel et al., "Rememberance of Data Passed: A Study of Disk Sanitization Practices", IEEE Security and Privacy, vol. 1, No. 1, 2003 19 pages.
Hill, David "Alacritus Software's Securitus: Defining the Way to Virtual Taped Libraries" Aberdeen Group Inc. Jul. 2003.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library", Alacritus Software, Inc., Oct. 3, 2001.
Hatfield. "Write Read Verify Feature Set". May 14, 2004.
Komeiga, Kevin, "Vendor Pushes Disk Backup Over Tape" SearchStorage.com, Jan. 10, 2003.
Chris Lueth, "WORM Storage on Magnetic Disks Using SnapLock Compliance™ and SnapLock Enterprise™", Network Applicance, Inc., Sep. 2003, sections 1-5 13 pages.
"Manageability: Securitus v. Tape", Alacritus Website, Oct. 2003.
Microsoft Windows XP, released 2001.
"Network Appliance WORM Storage Solution: SEC 17 a-4(f) Compliance Assessment", Network Appliance, Inc., Jul. 10, 2003, pp. i-20.
"No Changes Required: Securitus v. Tape" Alacritus Website, Oct. 2003.

Novell NetWare Server Disks and Storage Devices Administration Guide. Netware 5.1, Jan. 2000, pp. 1-60.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ "Alacritus Software Announces New Customers for Securitus VTLA", Alacritus Software, Inc. Jan. 13, 2004.

Preston, W. Curtis, "Surprise! Cheap Disks Cure Slow Backup", Storage Magazine, Jun. 1, 2002.

"Product Brief: Rhapsody/Alacritus-Securitus/Xpath Virtual Tape in the Fabric", The Enterprise Storage Group, Aug. 2002.

"Scalability: Securitus v. Tape", Alacritus Website, Oct. 2003.

"Seamless Integration", Alacritus Website, Oct. 2003.

"Securitus I White Paper: Disk Based Data Protection from Alacritus Software" Alacritus Software, Inc. Jul. 2001.

"Securitus White Paper: Disk Based Data Protection from Alacritus Software", Alacritus Website, Oct. 2003.

"Strengths: Securitus v. Tape", Alacritus Website, Oct. 2003.

"Testimonials", Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

Trimmer, Don "Tape Free Backup/Recovery: Requirements and Advantages: Virtualization Technology Will Encompass Many Applications, One of the Most Significant Possibly Being Backup/Recovery", InfoStor, Mar. 2002.

"Virtual Tape Library Technoloy Brochure", Alacritus Software Inc., Jul. 2001.

Co-pending U.S. Appl. No. 10/933,005 filed Sep. 1, 2004.

Co-pending U.S. Appl. No. 10/932,683 filed Sep. 1, 2004.

Co-pending U.S. Appl. No. 11/227,812 filed Sep. 14, 2005.

Notice of Allowance Mailed May 6, 2009 in Co-pending U.S. Appl. No. 11/227,812 filed Sep. 14, 2005.

Final Office Action Mailed Aug. 7, 2008 in Co-Pending U.S. Appl. No. 10/933,005 filed Sep. 1, 2004.

Final Office Action Mailed Aug. 10, 2007 in Co-Pending U.S. Appl. No. 10/933,005 filed Sep. 1, 2004.

Final Office Action Mailed Aug. 17, 2007 in Co-pending U.S. Appl. No. 10/932,683 filed Sep. 1, 2004.

Non-Final Office Action Mailed Dec. 30, 2008 in Co-Pending U.S. Appl. No. 10/933,005 filed Sep. 1, 2004.

Non-Final Office Action Mailed Jan. 7, 2008 in Co-Pending U.S. Appl. No. 10/933,005 filed Sep. 1, 2004.

Non-Final Office Action Mailed Feb. 8, 2007 in Co-Pending U.S. Appl. No. 10/933,005 filed Sep. 1, 2004.

Non-Final Office Action Mailed Jan. 22, 2007 in Co-pending U.S. Appl. No. 10/932,683 filed Sep. 1, 2004.

Non-Final Office Action Mailed Nov. 7, 2008 in Co-pending U.S. Appl. No. 11/227,812 filed Sep. 14, 2005.

Alacritus Software, "Topologies", http://web.archive.org/web/20050207065657/alacritus.com/products-diskvtape-schematics.php, Oct. 7, 2003, 3 pages.

Alacritus Software, "Securitus", http://web.archive.org/web/200312070553/www.alacritus.com/products-securitus.php, Oct. 2003, 1 page.

* cited by examiner

METHOD AND APPARATUS FOR VERIFIABLY MIGRATING WORM DATA

This application claims the benefit of Provisional U.S. patent application Ser. No. 60/636,424, filed on Dec. 14, 2004 and entitled, "Method and Apparatus for Verifiably Migrating WORM Data," which is incorporated herein by reference.

FIELD OF THE INVENTION

At least one embodiment of the present invention pertains to storage systems, and more particularly, to a method and apparatus for verifiably migrating Write-Once Read-Many (WORM) Data.

BACKGROUND

Many businesses rely on some form of WORM (write once, read many) data storage to store critical data. In many industries, such as the financial services and healthcare industries, businesses are required by strict records-retention regulations to archive important data, such as emails, transaction information, patient records, audit information, as well as other types of documents and data. Such records-retention regulations include, for example, Securities Exchange Commission (SEC) Rule 17a-4 (17 C.F.R. §240.17a-4(f)), which regulates broker-dealers; Health Insurance Portability and Accountability Act (HIPAA), which regulates companies in the healthcare industry; Sarbanes-Oxley (SOX), which regulates publicly traded companies; 21 C.F.R. Part 11, which regulates certain companies in the life sciences industry; and, DOD 5015.2-STD, which regulates certain government organizations; etc. Regulatory agencies generally recognize the ability of WORM data storage to ensure the permanence of archived data and therefore often require that only non-erasable, non-rewritable WORM storage be used for meeting their regulations.

In addition, many businesses place a premium on protecting certain business records or critical data files from accidental or intentional alteration or deletion. WORM functionality such as non-erasable and non-rewritable data storage can ensure long-term data permanence, even where regulatory compliance does not require the use of WORM storage.

Most current WORM implementations are based on older optical disk technology with limited storage capacity, slow data throughput, and substantial management overhead. Current WORM storage options include optical WORM platters, which each hold about 30 GB of data, and WORM tape, with each cartridge able to store about 50 GB of data. Traditional WORM storage vendors have circumvented the capacity limitations of individual media by implementing expensive, complex media library and jukebox solutions that house numerous media. Although this solution addresses capacity limitations, it creates the problem of ever-increasing management overhead for the volumes of full media removed from the library or jukebox.

As data storage technology advances, magnetic storage devices, such as magnetic disks, have become the preferred storage devices over optical disks for WORM implementations. One advantage of magnetic storage devices is the shorter time needed to retrieve data from the magnetic storage devices, because optical disks generally take a longer time to load before the optical disks can be searched. Magnetic storage devices also provide fast random access. Other advantages of magnetic disks include their generally higher capacity and lower cost. Moreover, it is relatively easy and economical to replicate the data stored in a magnetic storage device and to store the copy in another location. The ease in replication facilitates disaster recovery of the data storage system.

To address issues faced by growing business requirements for WORM data storage and to alleviate problems inherent with traditional WORM storage solutions, Network Appliance, Inc. of Sunnyvale, Calif., introduced a technology called SnapLock on its Filer and NearStore storage systems. SnapLock technology allows companies to implement the data permanence functionality of traditional WORM storage in an easy-to-manage, fast-access, low-cost, magnetic disk-based solution. Among other features, SnapLock allows a user to designate certain data files or volumes as WORM data, using the file system interface of the Data ONTAP® operating system. SnapLock provides the capability to ensure that when data are committed to WORM state, it cannot be altered or deleted. "WORM state", therefore, as the term is used herein, is defined as a non-deletable, non-modifiable state.

In some instances it may be desirable or necessary to migrate WORM data from one set of storage media to another. For example, a business may wish to move stored WORM data from an older set of storage media to a newer set of storage media, for the purpose of upgrading the storage system. The migration may be accomplished using a well-known data copying mechanism, such as that provided by Network Data Management Protocol (NDMP). However, migration of WORM data creates the problem of how to verify, after the data have been migrated, that the data have been stored at the destination accurately, in their entirety, and are still in WORM state.

One known technology used for WORM storage provides a way to verify data by assigning a digital signature to each individual data record (this technology is not file system based). A proprietary protocol is used to store data or to migrate data between storage media. Only an entity which has the digital signature and which implements the proprietary protocol can verify the data. Effectively, this generally means that only the storage system which created the digital signature can verify the data. This characteristic makes it essentially impossible to migrate WORM data to a storage system or set of storage media that uses storage technology different from that used to store the data. Furthermore, the digital signature is not readable by a human being.

What is needed, therefore, is a technique for use in a storage system to allow migration of WORM data while avoiding the above-mentioned problems associated with WORM data migration.

SUMMARY OF THE INVENTION

A file system in a storage system allows a user to designate data as write-once read-many (WORM) data. The WORM data are stored in a first set of storage media of the storage system. Signature data are then generated from the WORM data. Using the signature data, the integrity of the WORM data can be verified.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
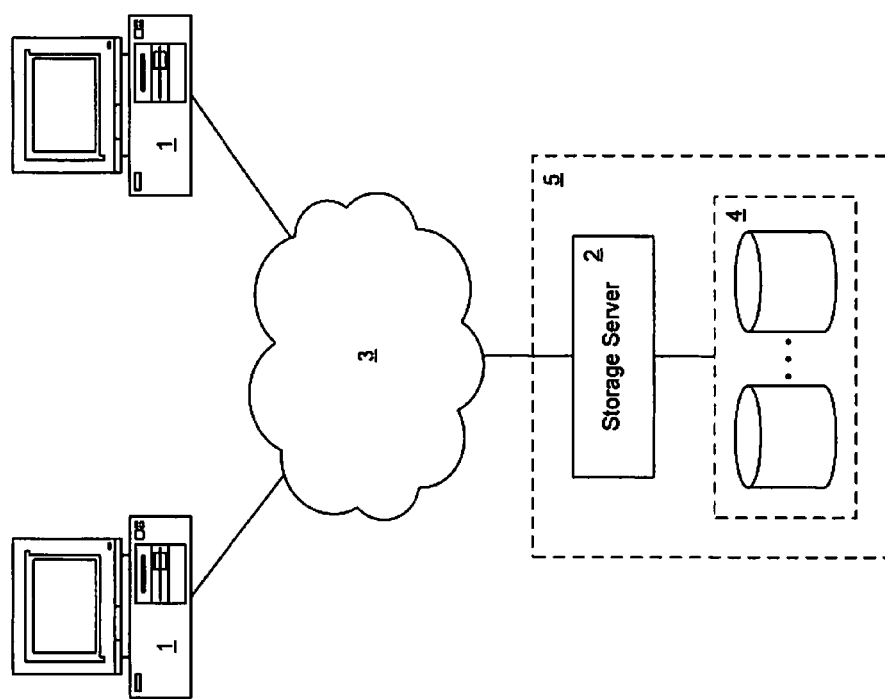
FIG. 1 illustrates a network environment in which the data verification technique introduced herein can be implemented.

A method and apparatus for verifiably migrating WORM data are described. As described in greater detail below, the technique introduced herein can be implemented in a storage server, such as a file server, a nearline storage device, a tape backup system, or other storage system. The technique according to certain embodiments includes providing a conventional (hierarchical) file system interface in a storage server, to allow users to access stored data, and allowing a user to designate at least a subset of the data as WORM data through the file system interface. In response to such user input, a human-readable, digitally signed signature file is created for the designated WORM data. The WORM data can then be verified using the digitally signed signature file.

The signature file identifies the files and/or other data items included in the designated WORM data and metadata associated with such data items. The metadata may include, for example, the directory hierarchy of the WORM data, file and directory attributes, the current WORM state of the data, the applicable retention period, information about the source storage server and the data set on the source storage server (e.g., storage system serial number, volume ID, etc.). For each file represented in the signature file, a cryptographic hash is generated and associated with that file within the signature file. The signature file as a whole is then digitally signed by attaching a human-readable (i.e., human-decodable) digital signature to it. This is accomplished in certain embodiments by using a cryptographic hash algorithm, and more specifically, by using a private key of a public/private key pair. In certain embodiments, the user can select which hash algorithm to use to generate the digital signatures. The digital signing of the signature file prevents undetectable tampering with, or modification of, the signature file. The signature file is easily transportable between storage systems, independently of the underlying data, and is further transportable between different technologies. Accordingly, the signature file can be used by any person who has the public key corresponding to the private key to verify that the WORM data have not been modified or tampered with before expiration of the applicable retention period.

This technique, therefore, allows easy verification of WORM data by a person on demand (e.g., for a regulatory audit), including WORM data that have been migrated between storage systems and/or across storage technologies. A significant advantage of this technique is that the signature file can be transported and used independently of the WORM data to which it relates. Consequently, when migrating the WORM data, the WORM data do not have to be sent through a secure channel (which may be limited in its data transfer speed). This technique therefore allows "out-of-band" verification of WORM data.

Certain embodiments of the present invention seek to meet the challenges posed by records-retention regulations such as those mentioned above. However, while the present invention is described herein in the context of complying with records-retention regulations, it will be appreciated that the present invention may find practical application in other situations where verification of WORM data or verifiable migration of WORM data is desirable.

FIG. 1 shows an example of a network environment in which one can implement this technique. The network environment includes a storage system 5, which includes a storage server 2 coupled locally to a set of mass storage devices 4 and coupled through a network 3 to a set of clients 1. In certain embodiments, the storage server 2 receives and responds to various read and write requests from the clients 1, relating to data stored in or to be stored in the mass storage devices 4.

The storage server 2 can be used for any of various different purposes, such as to provide multiple users with access to shared data and/or to back up mission critical data. The storage server 2 may be, for example, a file server (such as an appliance used to provide NAS capability), a block-based storage server (such as used to provide SAN capability), a "unified" storage device (i.e. one which combines NAS and SAN capabilities), a nearline storage device, a direct attached storage (DAS) device, a tape backup device, or essentially any other type of data storage device. The storage server 2 may have a distributed architecture, or all of its components may be integrated into a single unit.

Note that the term "server" is used herein only to facilitate description and does not imply that the technique introduced herein is limited to a client-server architecture. That is, a device which does not operate as a server can also implement the technique introduced.

The network 3 can be a local area network (LAN), a wide area network (WAN), a corporate intranet, the Internet, or any combination of such networks and/or other types of networks. Each of the clients 1 may be, for example, a conventional personal computer (PC), computer workstation, hand-held device, or the like.

The mass storage devices 4 may be, for example, conventional magnetic disks, optical disks such as CD-ROM or DVD based storage, magnetic tape storage, magneto-optical (MO) storage media, or any other type of non-volatile storage devices suitable for storing large volumes of data. In the case of disk storage media, the mass storage devices may be organized into one or more volumes of Redundant Array of Inexpensive Disks (RAID).

It is assumed for purposes of this description that the storage system 5 provides WORM storage capability and, in particular, enables a user (e.g., a user of any client 1 or a network administrator) to designate particular files or volumes stored in mass storage devices 4 as WORM data using a file system interface. To provide this capability, the storage server 2 may incorporate existing technology designed for that purpose, such as the SnapLock technology available with certain Filers and NearStore devices from Network Appliance, Inc.

Figure 2:
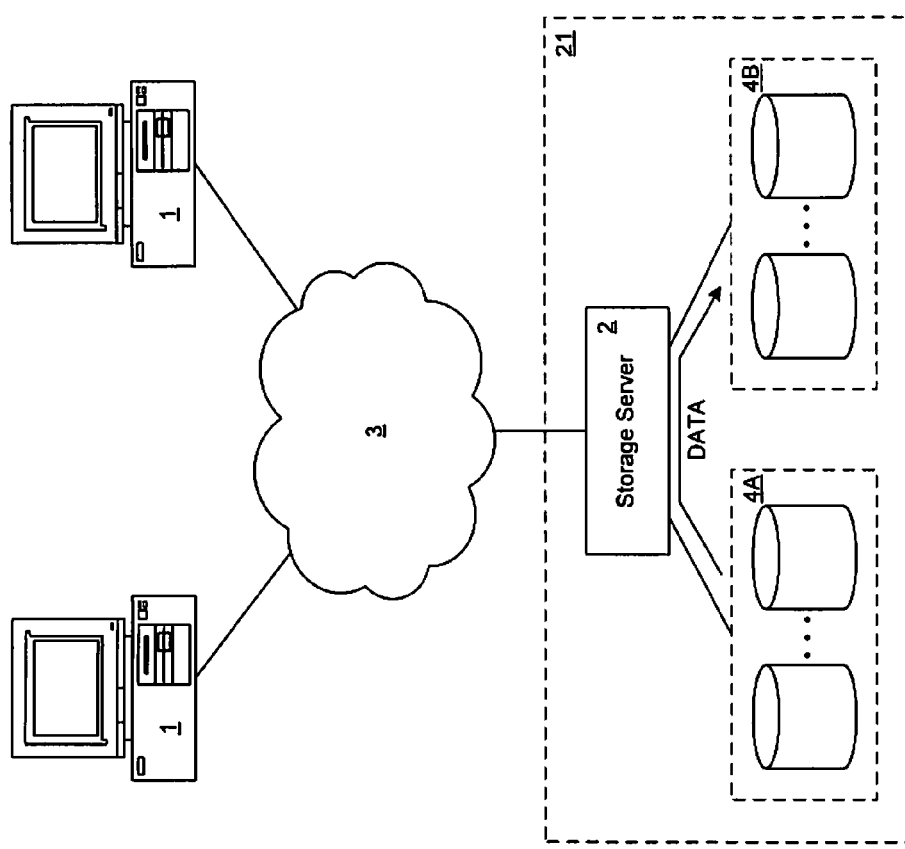
FIG. 2 illustrates a network environment in which data are migrated from one set of storage media managed by a storage server to another set of storage media managed by the storage server.
Figure 3:
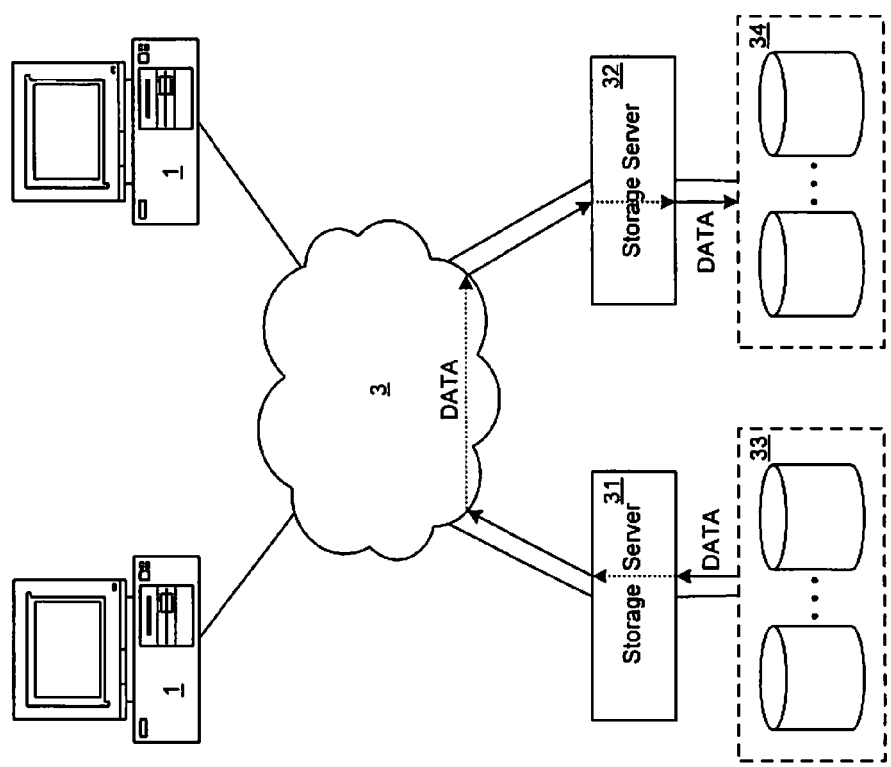
FIG. 3 shows a network environment in which data are migrated through a network from one set of storage media to another.

For various reasons, it may be desirable to migrate stored WORM data from a first set of storage media 4A to a second set of storage media 4B. The first and second sets of storage media may be managed by the same storage server, as illustrated in FIG. 2. In other embodiments, the technique introduced here may be used to facilitate verification of WORM data that is migrated from a first set of storage media 33 managed by a first storage server 32 (the "source" storage media and server, respectively) to a second set of storage media 34 managed by a second storage server 32 (the "destination" storage media and server, respectively), where the migration is done over a network 3. The source storage server 31 and destination storage server 32 may implement different storage technologies and protocols (i.e., disk storage versus tape storage) while still implementing the techniques introduced herein. The technique introduced here facilitates verification of the WORM data at any point in time in connection with such migration and/or in other situations (e.g., tamper detection on a particular computer).

Figure 4:
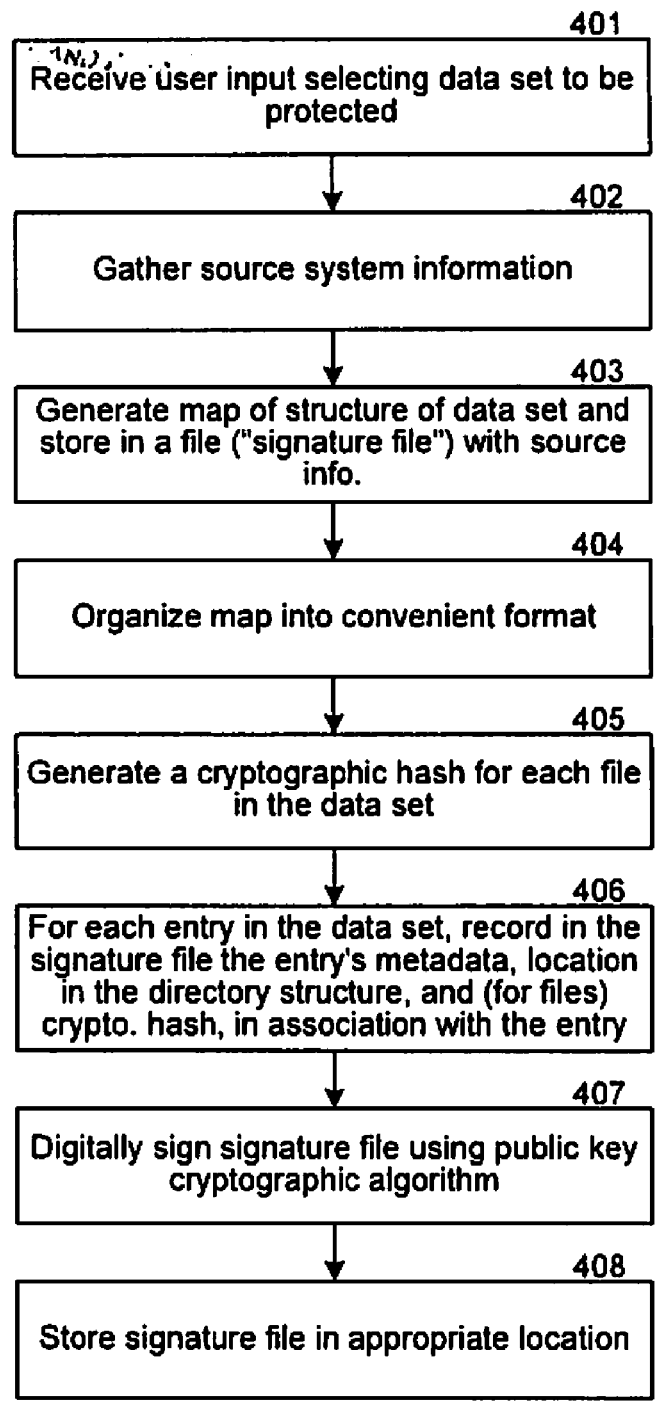
FIG. 4 is a flow diagram illustrating a process of generating a signature file.

FIG. 4 is a flow diagram illustrating a process of generating a signature file, according to an embodiment of the invention. The process can be executed on a source storage server on which WORM data initially resides or on another computer system which has authorized administrative access to the source storage server. Initially, at 401 a user input is received selecting a data set that is to be protected (verified), such as one or more files, a volume, etc. Next, at 402 information about the source system and the selected data set is gathered, such as the unique serial number of the source system and the volume ID or other unique identifier of the selected data set. At 403 a map of the structure of the data set is generated and stored in a file, called a "signature file", with the source information gathered in 402. The map indicates the locations of all of the entries within the data set (i.e., all of the files, directories, subdirectories, LUNs, or other types of data containers). The map may indicate, for example, the hierarchical directory structure of the data set and the position within that structure of each file and directory. The map further may include different sections for different types of entries, such as files and directories.

At 404 the map is organized into a convenient, human-readable format. For example, the map may be organized hierarchically to reflect the hierarchy of the data set it describes, or it may be sorted (e.g., alphabetically by file/directory name), etc. In addition, the map can be encoded into a convenient format if desired, such as extensible markup language (XML).

Figure 8:
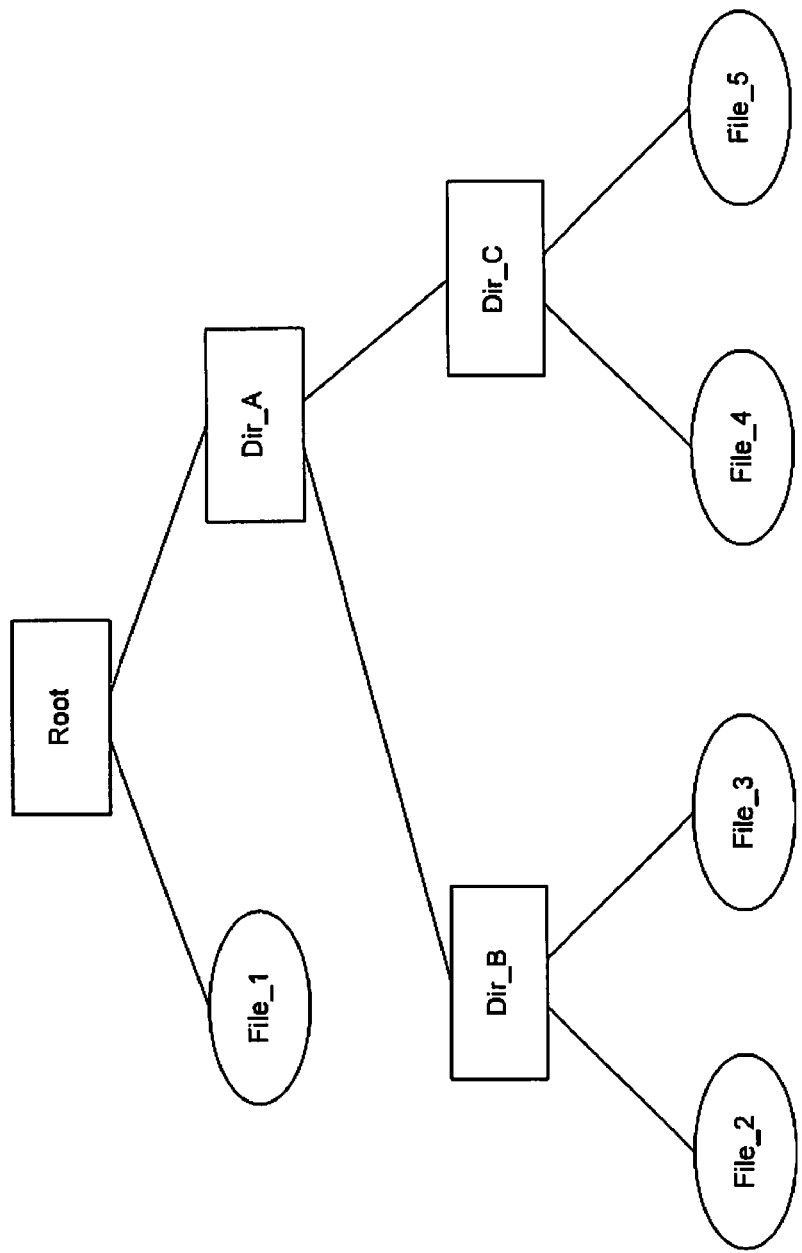
FIG. 8 shows an example of a simple hierarchical data set.

The specific format of the map depends upon the particular implementation of this technique and is not important for acquiring an understanding of this technique. However, as a simple example, consider the data set shown schematically in FIG. 8. The data set includes a number of files and a number of directories, arranged in a hierarchical structure. In FIG. 8, rectangles represent directories while ovals represent files. The map generated in 403 and 404, for the data set in FIG. 8, could have the following form:

Directories:
Root
Root/Dir_A
Root/Dir_A/Dir_B
Root/Dir_A/Dir_C
Files:
Root/File_1
Root/Dir_A/Dir_B/File_2
Root/Dir_A/Dir_B/File_3
Root/Dir_A/Dir_C/File_4
Root/Dir_A/Dir_C/File_5

Next, at 405 a cryptographic hash is generated for each file in the data set by using the private key of a public-private key cryptographic hash algorithm. The user may be given the ability to select from among multiple cryptographic hash algorithms for this purpose. Examples of such an algorithm include SHA-256, SHA-512, etc. At 406, for each entry in the data set (e.g., each file or directory), the cryptographic hash for that entry is recorded in the signature file in association with the entry (except for directories), along with metadata for the entry and the location of the entry within the data set. This operation may involve, for example, integrating the cryptographic hash and metadata into the map generated in 403 and 404 within the signature file, or creating a table within the signature file to associate the hash values and metadata with the corresponding entries.

The metadata for an entry may include, for example, file and directory attributes, the current WORM state of the entry (i.e., whether it is currently in WORM state or not), the applicable retention period (if the entry is in WORM state), the information about the source storage server and data set (e.g., storage system serial number and volume ID), etc.

The signature file as a whole is then digitally signed at 407 by using the private key of a public-private key cryptographic hash algorithm. The digital signature is electronically attached to the signature file. The hash algorithm used in 407 may be the same algorithm as that used for the individual file entries in 405, although not necessarily. At 408 the digitally signed signature file is then stored in an appropriate location on the source storage server or another computer that has administrative access to it, for subsequent use during verification.

Figure 9:
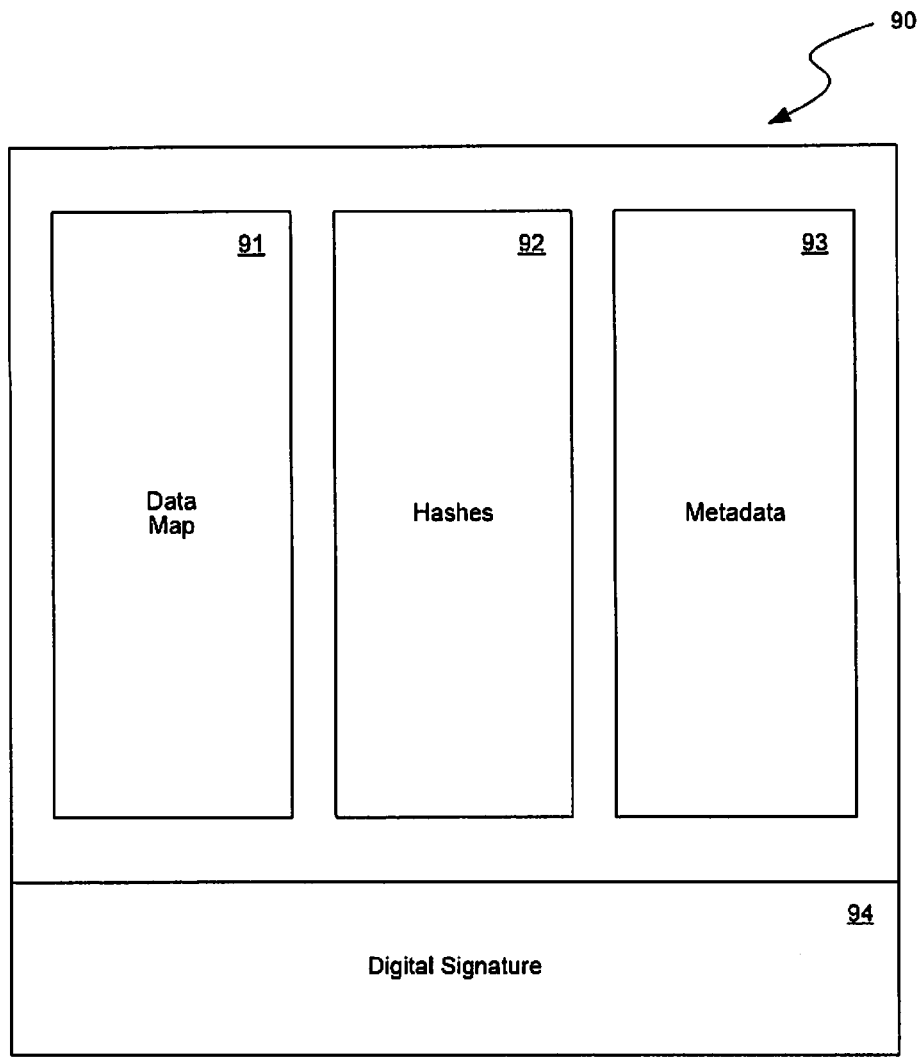
FIG. 9 illustrates a signature file.

Thus, as shown in FIG. 9, a signature file 90 for a particular data set includes an association of: a data map 91 indicating the structure of the data set (i.e., the locations of all of the data entries in the data set); cryptographic hashes 92 of all of the file entries in the data set; metadata 93 for the data entries; and a digital signature 94 for the overall signature file 90.

Figure 5:
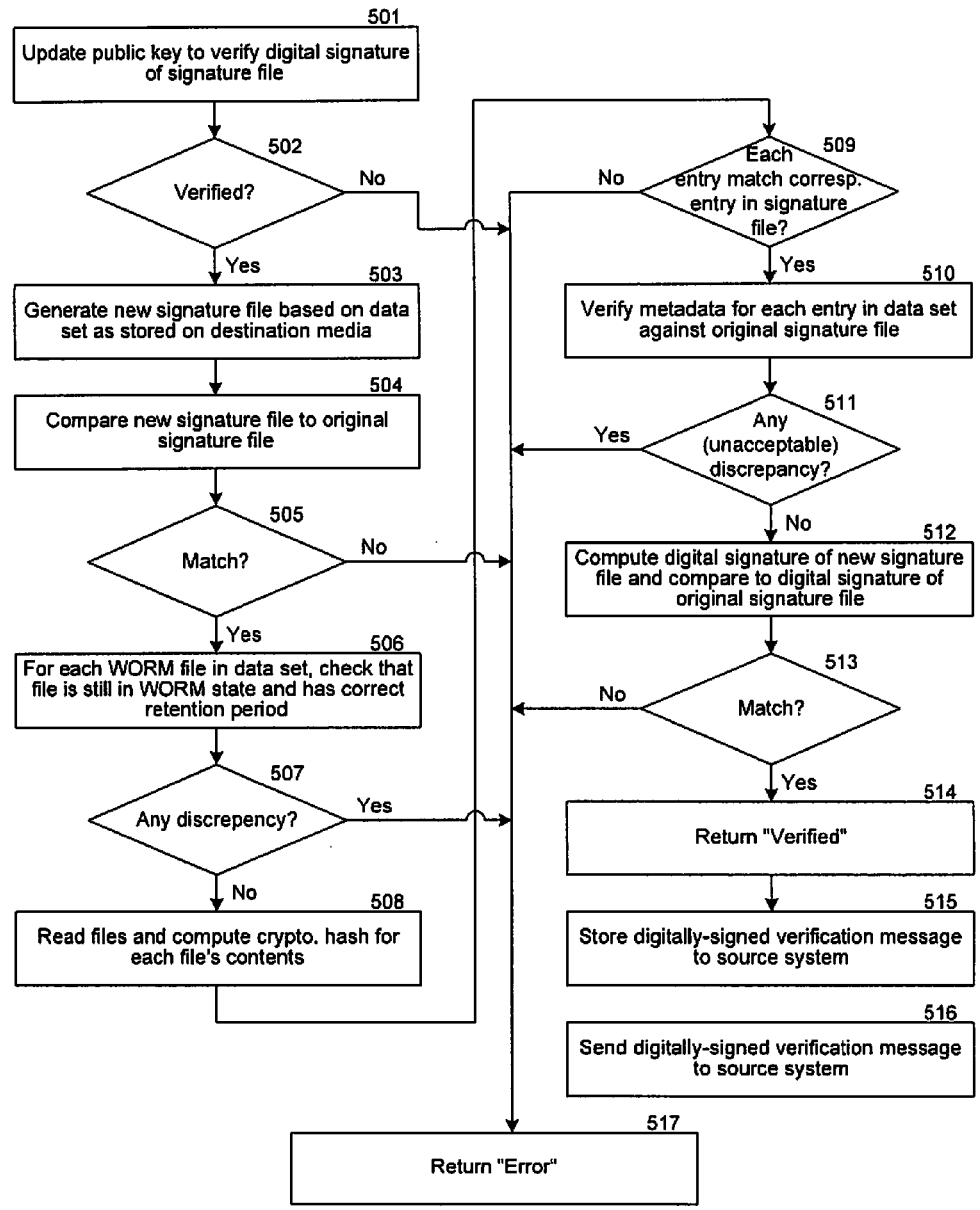
FIG. 5 is a flow diagram showing a process of using a signature file to verify stored data.

FIG. 5 is a flow diagram showing a process of using a signature file to verify WORM data, according to an embodiment of the invention. This process may be executed on a destination storage server to which WORM data have been migrated, or on another computer which has authorized administrative access to the destination storage server. Alternatively, this process can be performed on the source storage server to verify that there has been no tampering with the WORM data, or on another computer which has authorized administrative access to the source storage server.

Initially, at 501 a user verifies the digital signature of the signature file (generated by the process in FIG. 4). This is done by using the public key associated with the hash algorithm used to digitally sign the signature file. If the digital signature is verified (502), then at 503 a new signature file is generated for the data set as stored on the destination storage media, by using the process of FIG. 4. The new signature file is then compared to the original signature file at 505. If the two signature files do not match, then an error message is returned to the user at 517, and the process ends.

If the two signature files match, the process proceeds to 506. At 506 the process checks, for each WORM file in the data set, whether the file is still in WORM state and has the correct retention period. If any discrepancy is detected at this point (507), the process branches to 517, where an error message is returned to the user. If no discrepancy is found, then at 508 all of the files in the data set at the destination are read, and a cryptographic hash is computed for each file's contents. Next, at 509 the hash for each file is checked against the corresponding hash stored in the original signature file. If any discrepancy is detected at this point, the process branches to 517, where an error message is returned to the user.

If no discrepancy is found, then at 510 the process verifies that the metadata for each entry in the data set matches the corresponding metadata in the original signature file. If any unacceptable discrepancy is detected at this point (511), the process branches to 517, where an error message is returned to the user.

Certain types of discrepancies may be considered acceptable. For example, it may be acceptable to find that the retention period of a file or directory has been extended after the original signature file was generated, but it would not be acceptable to find that the retention period had been not shortened. Likewise, it may be acceptable to find that a file or directory which is now beyond its retention period has been modified. Further, in certain cases it may be acceptable to allow modification of certain specified files or subsets of the data set, but not others. The indicated WORM state of the entries in the original signature file can be used to determine this.

If no unacceptable discrepancy is found at 511, then the process continues to 512. At 512 the process generates a digital signature for the new signature file (generated in 503) and compares the digital signature to that of the original signature file. If the digital signatures do not match (513), the process branches to 517, where an error message is returned to the user. If the digital signatures match, then at 514 a message is returned to the user, confirming that the data set has been verified, i.e., no data in the data set have been tampered with or modified during the retention period. At 515, a digitally signed verification message (e.g., file) indicating this result is then stored in a convenient location, such as on the destination storage server. Optionally, at 516 the digitally signed verification message is then transmitted to another computer/user, such as the source storage server or another computer with authorized administrative access to the source or destination storage server.

Of course when using the above method to migrate data, a trustworthy "mechanism" to communicate the public key from the source storage system to the destination storage system is needed, i.e., a mechanism which would prevent unauthorized interception of and tampering with the public key. The degree of security that is required for this may vary according to the specific application, purpose and/or environment for which the data migration technique will be used. For example, such a mechanism could be a secure communication protocol used to communicate the public key from the source storage server to the destination storage server over a computer network. Alternatively, it could be as simple as an authorized (trusted) person remembering or holding a record of the public key and then physically transporting it to, and applying it at, the destination storage server as described above, or communicating the public key in a private way to another authorized (trusted) person who uses it at the destination. As one example, the trusted person might hold and transport the public key on a hand-held, non-volatile memory device (such as a compact flash, memory stick or USB hard drive), where physical access to the memory device is limited to such authorized person. Numerous alternatives are possible, as will be recognized by those of ordinary skill in the art.

Figure 6:
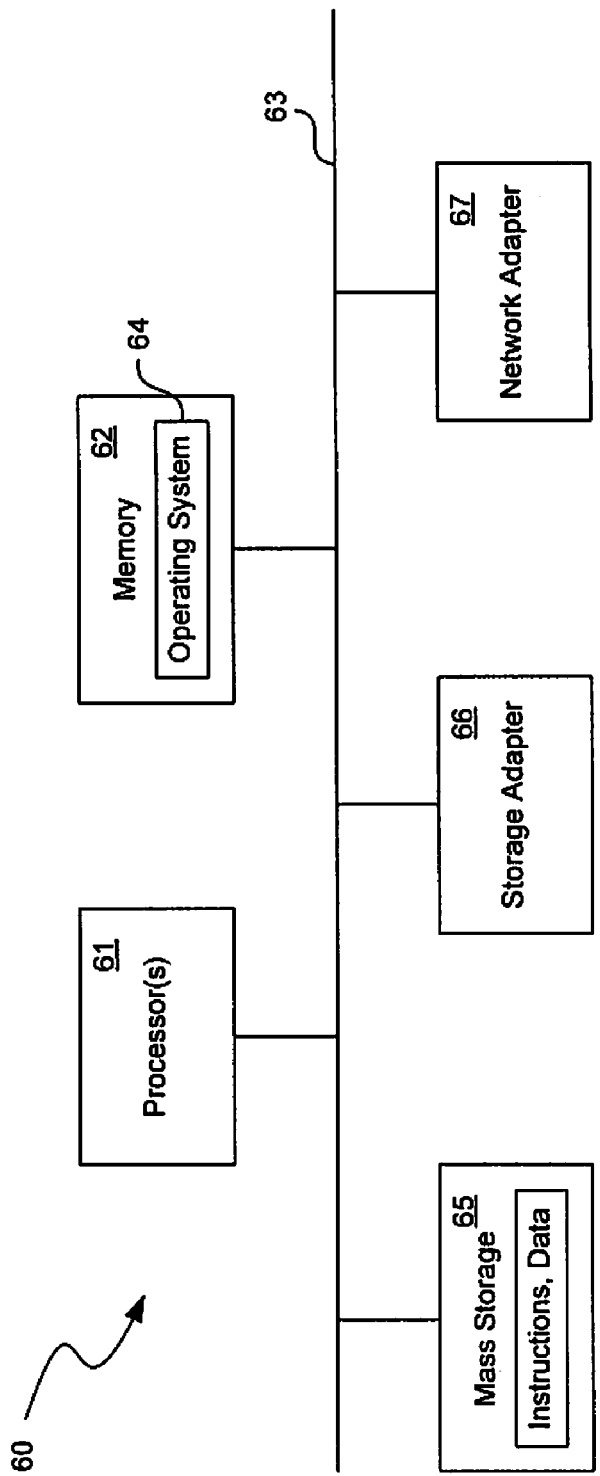
FIG. 6 is a block diagram showing the architecture of a storage server.

FIG. 6 is a block diagram showing an example of the architecture of a storage server that can implement the above-described technique. Certain standard and well-known components which are not germane to the present invention are not necessarily shown. The storage server 60 includes one or more processors 61 and memory 62, coupled to a bus system 63. The bus system 63 is an abstraction that represents any one or more separate physical buses and/or point-to-point connections, connected by appropriate bridges, adapters and/or controllers. The bus system 63, therefore, may include any one or more of, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the storage server 60 and, thus, control the overall operation of the storage server 60. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 is or includes the main memory of the storage server 60. The memory 62 represents any form of random access memory (RAM), read-only memory (ROM), flash memory, or the like, or a combination of such devices. Memory 62 stores, among other things, the operating system 64 of the storage server 60, in which the techniques introduced above can be implemented.

Also connected to the processors 61 through the bus system 63 are one or more internal mass storage devices 65, a storage adapter 66 and a network adapter 67. Internal mass storage devices 65 may be or include any conventional medium for storing large volumes of data in a non-volatile manner, such as one or more disks. The storage adapter 66 enables the storage server 60 to access the array of mass storage devices 4 and may be, for example, a Fibre Channel adapter or a SCSI adapter. The network adapter 67 provides the storage server 60 with the ability to communicate over a network with remote devices, such as the clients, and may be, for example, an Ethernet adapter or Fibre Channel adapter.

The storage server 60 may have an integrated architecture, where the network and data components are all contained in a single box. Alternatively, the storage server 60 may have a distributed architecture; for example, it may include a separate N-("network") blade and D-(disk) blade (not shown). In such an embodiment, the N-blade is used to communicate with clients, while the D-blade includes the file system functionality and is used to communicate with the storage subsystem. The N-blade and D-blade may communicate with each other using an internal protocol.

Figure 7:
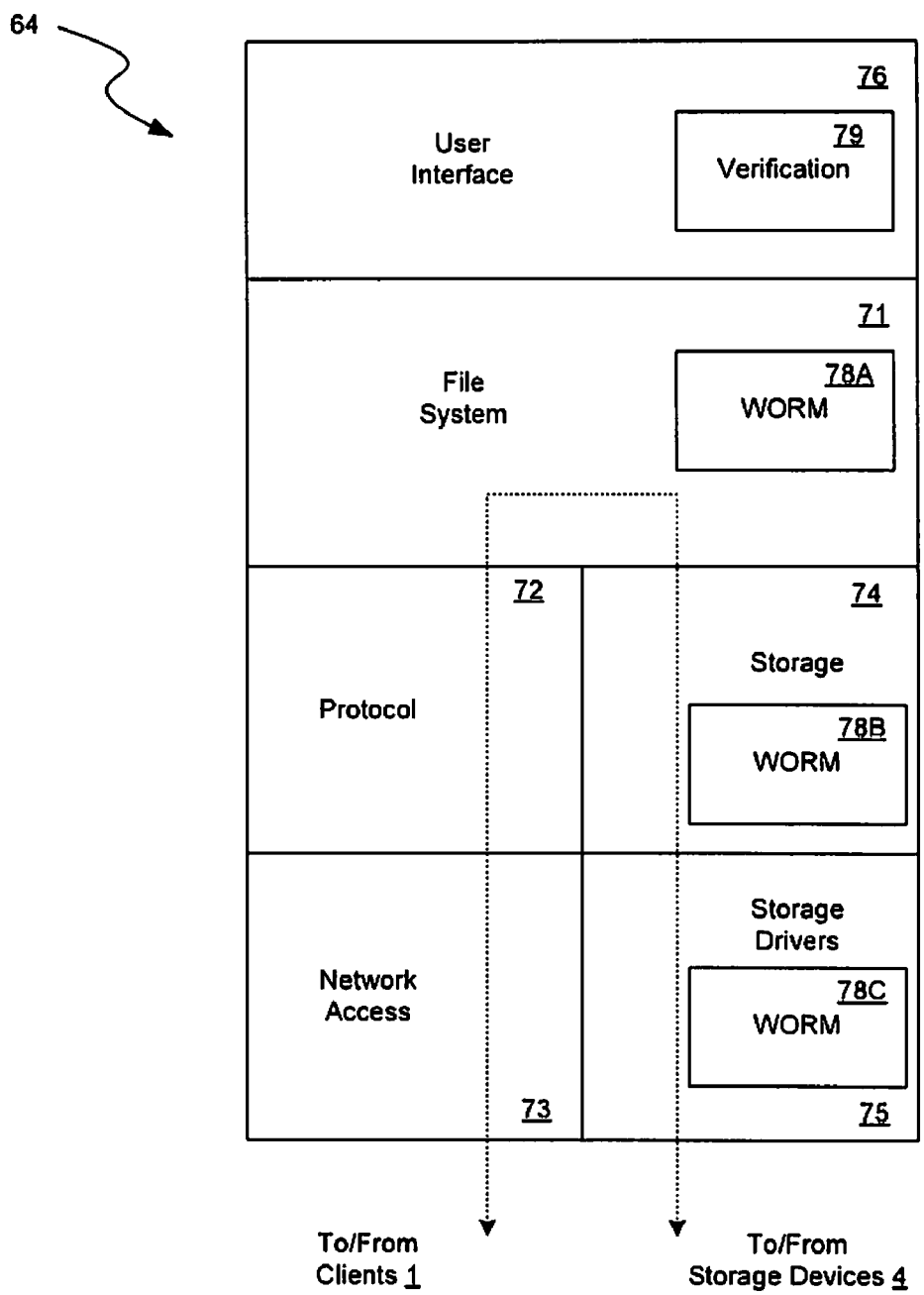
FIG. 7 shows an example of the operating system of the storage server.

FIG. 7 shows an example of the operating system 64 of the storage server 60. As shown, the operating system 64 includes several modules, or layers. These layers include a file system 71. The file system 71 is a programmatic entity that imposes structure on an address space of one or more physical or virtual storage devices, such as disks, so that the operating system 64 may conveniently read and write data containers, such as files and blocks, and related metadata. The file system 71 executes read and write operations on the mass storage devices in response to client requests, maintains directories, and manages consistency point operations.

Logically "under" the file system 71, the operating system 64 also includes a protocol layer 72 and an associated network access layer 73, to allow the storage server to communicate over a network (e.g., with clients). The protocol layer 72 may implement any one or more of various protocols, such as Network File System (NFS), Common Internet File System (CIFS), Hypertext Transport Protocol (HTTP) and/or Transfer Control Protocol/Internet Protocol (TCP/IP). The network access layer 73 includes one or more drivers which implement one or more protocols to communicate over the network, such as Ethernet.

Also logically under the file system 71, the operating system 64 includes a storage access layer 74 and an associated storage driver layer 75, to allow the storage server to communicate with the mass storage devices. The storage access layer 74 in certain embodiments implements a disk storage protocol such as RAID, while the driver layer 75 implements a lower-level storage device access protocol, such as Fibre Channel Protocol (FCP) or SCSI. Also illustrated in FIG. 7 is the path 77 of data flow through the operating system 64 between a client 1 and the mass storage devices 4.

In accordance with the techniques introduced above, the file system 31 includes a WORM module 78A, which cooperates with associated WORM modules 78B and 78C in the storage access layer 74 and the storage driver layer 75, respectively, to provide WORM storage capability accessible to a user of a client 1 through the file system 31. The WORM modules 78A, 78B and 78C may provide functionality such as that provided by the SnapLock technology of Network Appliance, Inc.

Logically on top of the file system layer 71, the operating system 64 also includes a user interface layer 76, through which a user of a client 1 or an administrative console can utilize features of the storage server 60. The user interface layer 76 may provide a command line user interface, a graphical user interface (GUI), or a combination thereof. In accordance with the technique introduced above, the user interface layer 76 includes a verification module 79, which implements the functionality described above with reference to FIGS. 4 and 5 in conjunction with the WORM modules 78A, 78B and 78C.

Further details of the above-mentioned layers of the operating system 64 are not necessary for an understanding of the invention and, hence, need not be described herein.

Thus, a method and apparatus for verifiably migrating WORM data have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   using a file system of a storage server to provide a user with access to data stored by the storage server;
   selecting a subset of the data stored by the storage server, the selected subset containing one or more data items, including at least one file;
   creating a signature file for the selected subset, the signature file specifying the data items contained in the selected subset and locations of said data items within the selected subset, the signature file further including metadata associated with each said data item, the metadata including a write once, read many (WORM) state indication for at least one data item in the selected subset;
   generating a cryptographic hash for each file in the selected subset and including each said cryptographic hash in the signature file in association with the corresponding file;
   using a private key of a public-private key pair to generate a first digital signature of the signature file as a whole;
   associating the first digital signature with the signature file;
   migrating the selected subset from a source set of storage media to a destination set of storage media; and
   using the signature file to verify the selected subset of the data, as stored in the destination set of storage media, including verifying a WORM state of the at least one data item.

2. A method as recited in claim 1, wherein the signature file is in human-readable form.

3. A method as recited in claim 1, further comprising:
   using the signature file to verify the integrity of the selected subset of the data.

4. A method as recited in claim 3, wherein using the signature file to verify the integrity of the selected subset of the data comprises:
   generating a second digital signature for the signature file; and
   comparing the first digital signature and the second digital signature to verify the integrity of the selected subset.

5. A method as recited in claim 1, further comprising:
   using a public key associated with the private key to verify the signature file.

6. A method as recited in claim 1, wherein the storage server comprises a file server.

7. A method as recited in claim 1, wherein the source set of storage media is managed by said storage server, and wherein the destination set of storage media is managed by a destination storage server.

8. A method as recited in claim 1, wherein the destination set of storage media comprises a tape storage medium.

9. A method as recited in claim 8, wherein the destination storage system comprises a tape based backup system.

10. A method as recited in claim 1, wherein using the signature file to verify the integrity of the selected subset of the data comprises, in a destination storage system:
    using a public key associated with the private key to verify the signature file;
    generating a second signature file to represent the selected subset of data as stored in the destination set of storage media;
    comparing the second signature file to said signature file;
    verifying metadata in the second signature file against the selected subset of the data, as stored in the destination set of storage media;
    using the private key to generate a digital signature for the second signature file; and
    comparing the digital signature for the second signature file with the digital signature of said signature file.

11. A storage system comprising:
    a processor;
    a storage interface, coupled to the processor, through which to communicate with a set of mass storage media;
    a file system to provide user access to data stored in the set of mass storage media; and
    a memory storing instructions which, when executed by the processor, cause the storage system to perform a process which includes:
    creating a signature file corresponding to a data set stored in the set of mass storage media, the signature file specifying data items contained in the data set, locations of each data item within the data set, and metadata associated with the data items;
    generating a cryptographic hash for each data item of a predetermined type in the data set and including each cryptographic hash in the signature file;
    generating a digital signature of the signature file as a whole;
    associating the digital signature with the signature file;

using the signature file to verify integrity of the data set, wherein the data set includes write once read many (WORM) data; and migrating the data set to another set of mass storage media, wherein the signature file is used to verify a WORM state of the WORM data and that the data set migrated to said other set of mass storage media is identical to the data set from which the signature file was created.

12. A storage system as recited in claim 11, wherein the signature file is in human-readable form.

13. A storage system as recited in claim 11, further comprising a network interface through which to communicate with a plurality of clients over a network, to allow the clients to access data stored by the storage system.

14. A storage system as recited in claim 11, wherein generating the digital signature of the signature file comprises using a private key of a public/private key pair to generate the digital signature.

15. A storage system as recited in claim 11, wherein said process is performed in response to user input applied through the file system interface.

16. A method comprising:
 using a directory-and-file based file system interface in a storage server to receive a selection by a user of a subset of data stored by the storage server, the selected subset including a plurality of files, the selection indicating that the plurality of files are to be protected;
 in the storage server, creating a signature file for the plurality of files in the selected subset in response to the selection, the signature file specifying the files included in the selected subset and the locations of the files within the selected subset, the signature file further including metadata associated with each said file, the metadata including a write once, read many (WORM) state indication for at least one file in the selected subset;
 in the storage server, generating a cryptographic hash for each file in the selected subset and including each said cryptographic hash in the signature file in association with the corresponding file;
 in the storage server, using a private key of a public-private key pair to generate a first digital signature of the signature file as a whole;
 associating the first digital signature with the signature file;
 migrating the selected subset from a first set of storage media to a second set of storage media;
 using the signature file to verify a WORM state of the selected subset; and
 using the signature file to verify that the selected subset migrated to the second set of storage media is identical to the selected subset from which the signature data was generated.

17. A method as recited in claim 16, wherein the first set of storage media is managed by a first storage server and the second set of storage media are managed by a second storage server of a different type from the first storage server.

18. A method as recited in claim 17, wherein said using the signature file to verify that the selected subset migrated to the second set of storage media is identical to the selected subset from which the signature data was generated is performed by the second storage server.

* * * * *